United States Patent Office 3,394,550
Patented July 30, 1968

3,394,550
METHOD OF WATER HARVESTING
Richard L. Ferm, El Cerrito, Calif., assignor to Chevron Research Company, San Francisco, Calif., a corporation of Delaware
No Drawing. Filed Sept. 28, 1966, Ser. No. 582,493
2 Claims. (Cl. 61—1)

ABSTRACT OF THE DISCLOSURE

A method for treating water catchment or storing surfaces to inhibit the discoloration and spoilage thereof by first applying a sterilant to the soil surface, next, a bitumen containing coating to stabilize the soil and after the latter coating has set applying a final coating of a composition consisting essentially of from about 10 to about 50% by weight of an asphalt, from about 5 to 40% by weight of leafing-grade aluminum, the balance to make 100% by weight of the composition being a petroleum hydrocarbon solvent.

---

The present invention relates to an improved method of harvesting water in arid regions.

Water harvesting is a term employed to cover the entirety of operations of collecting and conveying into specially provided "catchments" the precipitation from upper areas with a higher runoff of rainfall and snowfall downhill to lower arid flatlands. Catchment techniques are old in the art. People from ancient times on have built ditches to collect and to direct the runoff from hillsides to lower lying areas for irrigation of the waterthirsty but otherwise tillable soil. The problem still remains acute, whether it be in Asia, Africa, Australia or America. In the dry, moisture-poor parts of Southwestern United States, wild life and livestock need water for survival.

Construction of aprons from metal and/or concrete and storage tanks, likewise of metal and/or concrete, for catching and storing runoff to keep the animals and birds alive is costly, considering not only the rising cost of materials, but the distances and volumes involved. A number of cost-saving methods have been proposed and actually carried out into practice, some very successfully, others only partly successfully. However, the need for betterment, that is, for more and more effective methods of "catching" or "harvesting" water for arid areas always remains with us.

Way back in the times of Chaldeans, asphalt was known as a binding material capable of being used as a waterimpermeable coating for ditches and canals to carry the run-off water to the plains. Unfortunately, this coating would not last forever and deteriorated through exposure to air, sunlight and heat. However, asphalt coatings continue to be used to harvest water. While water collected in harvesting systems using asphalt coatings, either as such or as cutbacks and emulsions, is satisfactory for irrigation purposes, animals and even birds, although suffering from thirst, are often reluctant to drink this water because of several drawbacks traceable to the use of asphalt in constructing catchment systems. One drawback of the water thus collected is its characteristic asphaltic taste and petroleum-like smell of this water. Another drawback is the yellow color of the water, more than often from brownish to a very dark brown, particularly at the surface, which furthermore may become covered by a layer of brownish scum repulsive to animals and birds. This last drawback is caused by the oxidation, on weathering, of certain components of asphalt, which form color bodies which are then leached out into the water.

The present invention enables eliminating substantially, if not entirely, the aforementioned drawbacks by treating water catchment systems, that is, inside surface of ditches, troughs, aprons, pools, basins, tanks, etc. with an aluminum-asphalt coating composition applied in a particular sequence of steps.

First of all, a base is constructed. This is done by treating the soil with a sterilant to destroy the seeds, e.g., by means of a conventional "chlorinated borax" treatment. Thereafter, a first "base" bitumen-containing coating of either crude oil, crude oil emulsion, cutback asphalt or an asphalt emulsion is laid on the surface of the soil to stabilize it. Usually this stabilization treatment is carried out to a depth of from about ½ inch to ¾ inch at the rate of from about ¼ to 1 gallon of a base bituminous coating, such as cutback asphalt, per one square yard of the soil surface.

If desired, the stabilized soil surface is additionally sealed with a second application of a bitumen-containing coating, preferably an asphalt emulsion, using, for instance, ½ gallon of a rapid-setting paving emulsion per one square yard of the surface, to form an impervious membrane over the soil surface. After allowing these coatings to set or cure, the so-pretreated base is coated with a composition consisting essentially of from about 10 to about 50% (preferably 20 to 40%) by weight of an asphalt, from about 5 to about 40% by weight of a leafing-grade aluminum pigment, the balance of the composition to 100% by weight being a volatile petroleum hydrocarbon solvent boiling in the range from about 120 to about 400° F. This last composition is applied at the rate of from about 0.05 to 1.0 pound per square yard of the surface being coated.

The following example will illustrate the construction of a water-collecting catchment coated with the asphaltaluminum composition. A gently sloping hillside area about 100 feet by 100 feet, located about 5 miles south of the point known as Frazier's Well on the Hualapi Indian Reservation in Northern Arizona, was first smoothed, sprayed with a solution of chlorinated borax to kill weeds, and then sprayed with asphalt cutback grade MC-250 in an amount of about ¾ gallon per square yard to penetrate and stabilize the soil. Next a cationic rapid-setting asphalt emulsion of the type used commercially for road construction was applied in an amount of about ¼ to ⅓ gallon per square yard to seal the surface. Finally the asphalt-aluminum composition in an amount of 15 gallons was applied by spraying to a portion of the catchment area 40 feet by 100 feet. This is equivalent to 444 square yards and represents a treatment level with the asphalt-aluminum coating of about 0.034 gallon per square yard. The balance of the asphalttreated area was left unprotected for comparative purposes. A small catchment basin was constructed to collect the run-off water for use by livestock. After two years of weathering, the asphalt-aluminum coated area is still in good condition while the area treated with asphalt alone is badly deteriorated.

The results of this preparation of water catchment systems are startlingly surprising. The water, which, in the case of coatings with asphalt (or its emulsion) alone, sooner or later (and generally sooner) turns to be brownish, smells of petroleum crude and is covered by a layer of scum, in the system constructed in accordance with the invention by using an asphalt-aluminum coating on ditches for conveying the rainfall run-off and on catchment basins, is not discolored but clear and remains so for weeks and months. Moreover, in the absence of obnoxious surface film (scum), animals seeking to quench their thirst are not repelled and drink the water.

The pretreatment of the soil base before applying the asphalt-aluminum composition to catchment systems assures the optimum collection and the clear appearance and character of the water, while the presence of aluminum contributes toward extending the life of the coating.

Preliminarily, a laboratory test was carried out simulating the treatment of a catchment basin surface in accordance with the invention.

Soil consisting of 15% by weight of clay and 85% by weight of fine sand was employed to fill up a pan 8⅜ inches by 8⅜ inches in area (0.0573 sq. yd.) and 1¾ inches deep. The weight of the pan empty was 192 grams. It was filled with the aforementioned soil to about ⅛ inch from the top, and the whole (pan and soil) was then found to weigh 3240 grams. The asphalt emulsion of slow-setting type (59% residue) was diluted with an equal weight of tap water to make 306.4 grams and the dilution "flooded" over the soil surface in the pan. Since the dilution was not penetrating into the soil spontaneously, the surface of the soil was mixed with the diluted emulsion, using a spatula to give a uniform mixture to a depth of ¾ inch, and the whole put aside to dry and set. After this coating became dry, the surface was coated (½ of the whole area only) with 4.5 g. of a mixture of leafing-grade type aluminum pigment (0.45 g.) and asphalt cutback (3.05 g.), using a paint brush. Upon application, the pan was placed on the roof of the laboratory for exposure to the weather. From time to time, the water collected on the top of the surface in the pan was observed, and no discoloration which would be due to the oxidized components of asphalt was noted. After having been exposed as long as two years, the aluminum-asphalt film, with the aluminum flakes apparently having risen to the top of the coated surface, remained shiny and reflected the sun rays without displaying cracks and deterioration.

This laboratory trial was confirmed in actual practice by a 50 foot by 50 foot run-off water catchment built at Granite Reef Dam about 10 miles northeast of Mesa, Arizona. The soil was prepared by smoothing and the application of a chlorinated borax solution to kill weeds. A cutback asphalt was sprayed on the soil at a rate of about ¾ gallon per square yard to penetrate and stabilize the soil. Next an asphalt emulsion seal coat was applied at a rate of about ⅓ gallon per square yard. Finally, the entire cured asphalt surface was coated by spray application with 5 gallons of the asphalt-aluminum composition. Water collected over a period of one year from this catchment contained very little color as compared with an adjacent asphalt-coated collecting area built in identical fashion except for the absence of the protective asphalt-aluminum composition.

The foregoing description of the present invention is for the purpose of illustration only and is not limiting to the scope of this invention which is set forth in the claims.

I claim:

1. The method of treating water catchment systems to improve the quality of the water collected therein, said method comprising: First applying to the soil base of the catchment system a weed-killing sterilant, then applying a bitumen-containing coating to stabilize said soil base to a depth from about 0.25 to about 0.75 of an inch, and, after this coating has set, applying thereto a final coating of a composition consisting essentially of from about 10 to about 50% by weight of an asphalt having a softening point in the range from about 100 to about 250° F., from about 5 to about 40% by weight of leafing-grade aluminum, the balance to make 100% by weight of said last coating composition being a petroleum hydrocarbon solvent boiling in the range from about 120 to about 400° F.

2. The method as defined in claim 1, wherein the step of stabilizing the soil base with a bitumen-containing coating is followed by a step of sealing the stabilized soil base with an asphalt emulsion capable of forming an impervious membrane, before applying thereto the final asphalt-aluminum coating composition.

References Cited
UNITED STATES PATENTS

| | | | |
|---|---|---|---|
| 2,051,505 | 8/1936 | Van Hulst | 61—36 |
| 3,296,165 | 1/1967 | Kemp | 106—277 X |

JACOB SHAPIRO, *Primary Examiner.*